United States Patent [19]

Forsell

[11] 3,894,955
[45] July 15, 1975

[54] SEDIMENTATION APPARATUS FOR INCREASING THE TRANSPORT CAPACITY OF SEDIMENT

[75] Inventor: Bo Forsell, Nynashamn, Sweden

[73] Assignee: Rederiaktiebolaget Nordstjernan, Stockholm, Sweden

[22] Filed: July 9, 1974

[21] Appl. No.: 486,798

[30] Foreign Application Priority Data
July 9, 1973 Sweden.......................... 7309625-7

[52] U.S. Cl. .............. 210/322; 210/519; 210/522
[51] Int. Cl............................................. B01d 21/10
[58] Field of Search ....... 209/1, 158, 157, 436, 437; 210/19, 322, 521, 522, 324, 519, 83, 84

[56] References Cited
UNITED STATES PATENTS

| | | | |
|---|---|---|---|
| 2,183,896 | 12/1939 | Rupp et al. .......................... | 210/19 |
| 2,902,160 | 9/1959 | Anderson............................. | 210/324 |
| 2,958,655 | 11/1960 | Brown.................................. | 210/19 |
| 3,507,390 | 4/1970 | Mozley ................................ | 209/437 |
| 3,552,554 | 1/1971 | Olgard ................................ | 210/521 |
| 3,794,167 | 2/1974 | Olgard et al. ....................... | 210/522 |

Primary Examiner—Charles N. Hart
Assistant Examiner—F. F. Calvetti
Attorney, Agent, or Firm—Pollock, Philpitt & Vande Sande

[57] ABSTRACT

Sedimentation apparatus for continuously treating a liquid suspension to separate clarified liquid from sediment. The apparatus comprises a housing and a plurality of inclined parallel plates within the housing which provide parallel inclined passages for the passage of the liquid suspension therebetween. An inlet means is provided for delivering the liquid suspension to all of the passages, and the plates are mounted with a yieldable connection relative to the housing. A vibrator means for the plates is provided which vibrates the plates with oscillations occurring substantially only in the direction of inclination of the plates so as to prevent deposits of sediment on the plates but without disturbing the sedimentation. In addition, means is provided for receiving the clarified liquid and also the sediment which are discharged from the passages.

7 Claims, 6 Drawing Figures

SEDIMENTATION APPARATUS FOR INCREASING THE TRANSPORT CAPACITY OF SEDIMENT

The theory for separation by means of gravity (sedimentation separation) that the capacity-determining parameter in a sedimentation tank is the available surface on which the solid material (the sediment) may settle. From this knowledge, a great number of different so called lamella sedimentation apparatuses has been proposed. In such apparatus, the settling or sedimentation surface consists of a number of substantially parallel plate elements or lamellas arranged with a small spacing in relation to each other and having a certain inclination to the horizontal. Thus, the apparatus consists of many parallel sedimentation spaces or passages. The advantage of such a lamella apparatus is that the settling or sedimentation surface per apparatus volume is at least 10 times larger than the sedimentation surface in a conventional sedimentation basin.

Two basic problems have to be solved in order to successfully put the lamella sedimentation idea into action.
1. Equal distribution of the flow solid phase/liquid-mixture on all settling surfaces must be established. (A lamella apparatus may include several hundreds of sedimentation spaces).
2. The solid phase, which is separated and settled on the plate elements, must be continuously removed.

For the first problem satisfactory solutions already exist; however, the lack of a satisfactory solution of the second problem one has often required the use of less desirable alternatives.

For operating a lamella sedimentation apparatus free of disturbances, it is essential that the solid particles, which settle on the inclined lamellas and form a sludge thereon, are continuously transported away as quickly as the separation takes place. Otherwise, the apparatus will after a time become clogged so that cleaning will be required.

The force of gravity causes the transport of sludge downwardly along the plate elements. the qualities of the sludge which are of importance for its transport are the density differences between the sludge layers and the viscosity of the sludge layer. Sludge can be considered as a non-newton liquid. Furthermore, the friction coefficient between a sludge layer and a plate element is of great account.

In order to ensure sludge transport, lamella sedimentation of the prior art are built of material which, to the utmost possible extent, maintains an even, smooth surface, and the plate elements are arranged with a relatively large angle of inclination relative to the horizontal plane. It is to be noted in this respect, that the utilized surface of the plate element is equal to its projection on the horizontal plane; thus, the separation capacity of the plate element decreases with increasing angle of inclination.

In spite of these measures, lamella sedimentation apparatuses are often subjected to operating interruptions as a result of sludge clogging. Many sludges such as are encountered in sewage water clarification and clarification/thickening in industrial processes have such severe clogging tendencies, i.e. such poor transport qualities, that lamella sedimentation apparatuses cannot at all be utilized.

The present invention relates to a sedimentation apparatus for increasing the transport capacity of sediment, comprising a sedimentation tank or housing, substantially parallel plate elements arranged in the tank inclined in relation to the horizontal plane, said plate elements forming separate sedimentation spaces, in each of which sedimentation takes place independently of the sedimentation in the other sedimentation spaces, and collecting means arranged below the lower edge of the plate elements for collecting the sediment.

To obtain the desired increase of the transport capacity, the present invention is characterized in that said plate elements are arranged in the tank without stiff connection therewith and that at least one vibrator means is connected to the plate elements via means for vibrating the plate elements with substantially only oscillations in said inclined extension of the plate elements.

By applying such oscillations and, at the same time, preventing or significantly reducing a transfer of the oscillations to the sedimentation tank, the transport capacity is essentially increased without deleteriously disturbing the sedimentation process per se. Deposits on the plate elements are in certain cases completely prevented and, in processes having servere clogging tendencies, clogging is prevented at least over a considerably longer operating time compared with previously known sedimentation apparatuses. Thus, by the invention, measures have been taken to obtain controlled vibrations for increasing the transport capacity but without disturbing the sedimentation per se. The vibrations may be supplied continuously or periodically as may be required by the actual sedimentation process under consideration.

In an embodiment according to the invention, the plate elements are arranged in at least one compound package. Preferably, one vibrator is coupled to each package. Furthermore according to the invention, the plate elements (or the plate element package or packages are arranged in the sedimentation tank on a resilient support or are resiliently suspended in the sedimentation tank.

The invention is illustrated by way of examples in the accompanying drawings wherein, FIG. 1 is a lateral view, partially broken, of a lamella sedimentation apparatus known per se, to which the present invention can be applied.

Figure 1:
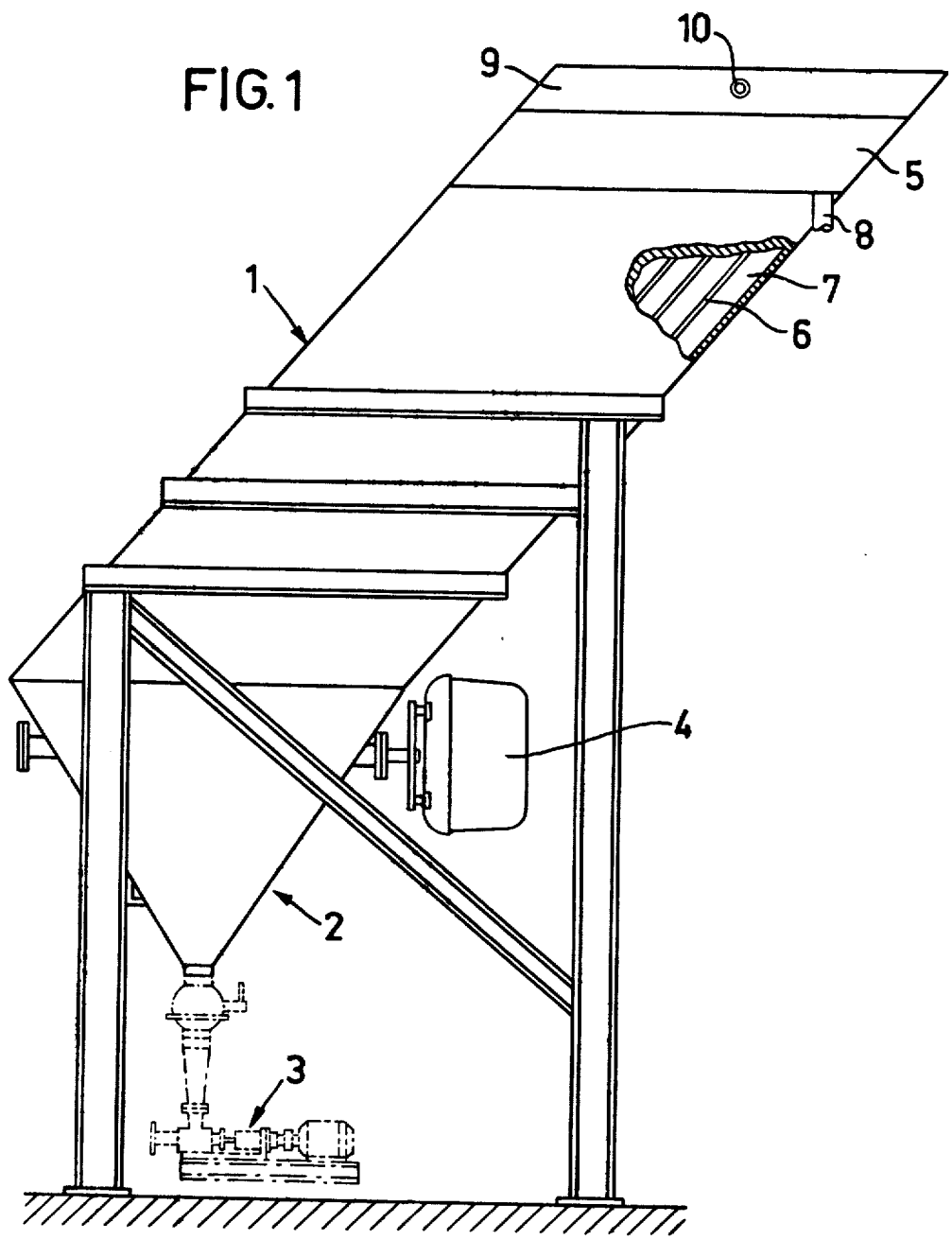

The lamella sedimentation apparatus, which in FIG. 1 is shown suspended in a stand, comprises a sedimentation part 1 and an outlet part 2 in the form of a trough for the sediment, which is pumped out of the trough by a pump means 3. On the trough there is further provided a vibrator 4. The apparatus is known per se and is for example shown in our U.S. Pat. No. 3,794,167.

The sedimentation part 1 comprises a plurality of lamellas or plate elements 6 immersed into the sedimentation part, which is filled with liquid. The plate elements are arranged inclined relative to the horizontal plane and have U-shaped section with lateral legs 7 to form separated sedimentation spaces. The sedimentation takes place in each sedimentation space independently of the remaining sedimentation spaces, in such a manner, that the heavier particles in the suspension sink to the upper surface of the plate element in each sedimentation space and thereafter slide down along the inclined plate element to the trough, bhile the clarified liquid is caused to ascend and flows out through outlets in the upper portion of the plate element space to collecting boxes 5 arranged on both sides of the apparatus and provided with down pipes 8. The suspension is supplied to the lamella sedimentation apparatus via a distributing box 9 with an inlet socket 10. The distributing box has no bottom and extends over all sedimentation spaces. It also extends some distance down into the apparatus. Such a distributing box is also disclosed in our above mentioned U.S. Pat. No. 3,794,167.

Figure 2:
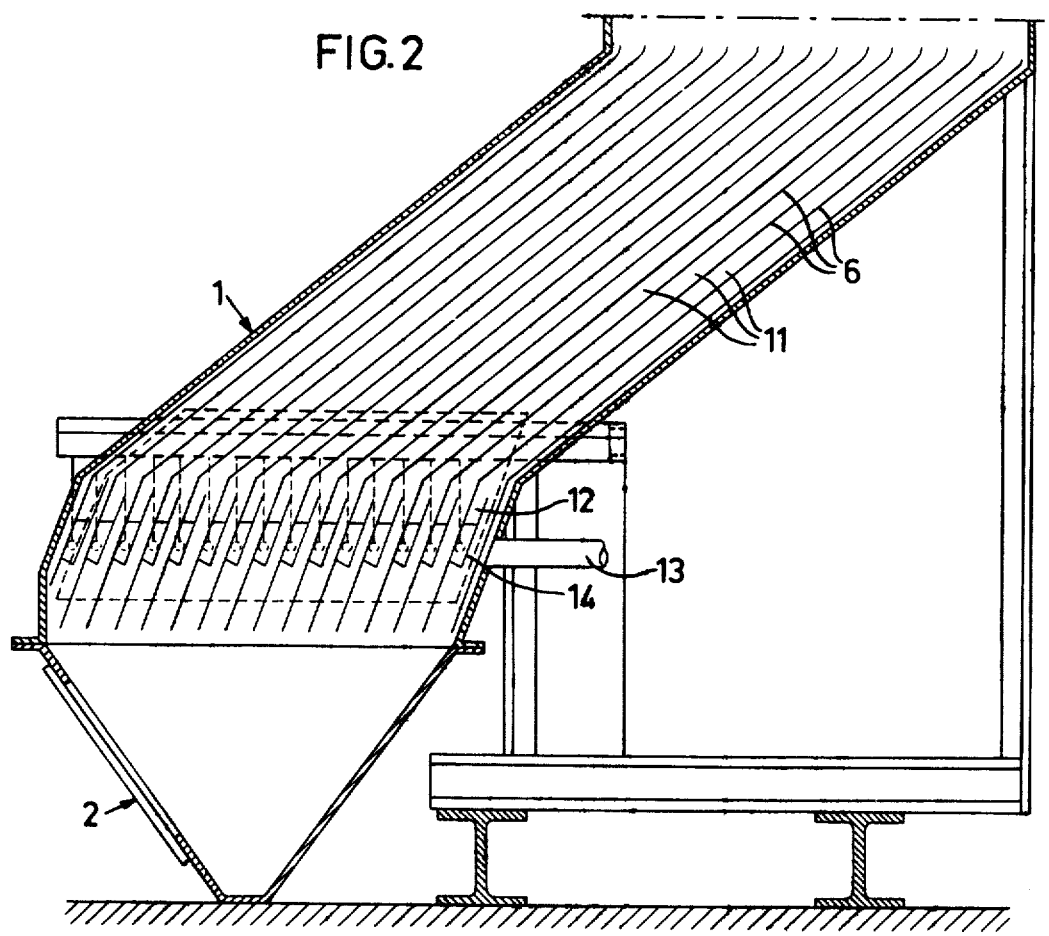
FIG. 2 shows, partially in lateral view, partially in longitudinal section, another lamella sedimentation apparatus known per se, to which the present invention can be applied.

FIG. 2 illustrates another known lamella sedimentation apparatus. This apparatus operates according to the co-current principle, i.e. the sediment and the clarified liquid flow in the same direction from an inlet (not shown) above the plate elements 6 through the separated sedimentation spaces (here designated as 11) down to separated outlets for the sediment and the clarified liquid respectively, arranged at the lower edges of the plate elements. The sediment slides along the plate elements down into the outlet part or sludge pocket 2 and is pumped out, while the clarified liquid is collected in a collecting box located in each sedimentation space above the sludge flow. The clarified liquid is drawn off from the bottom of each collecting box through a pipe 13. The pipes 13 from each of the collecting boxes connect with a common discharge pipe 14 which runs along one side of the apparatus. Also this apparatus according to FIG. 2 is previously known and is for example disclosed in our U.S. Pat. No. 3,552,554.

The apparatuses according to FIGS. 1 and 2 are in this connection only illustrated as examples of apparatuses, to which the present invention is applicable. In these and other similar apparatuses, the plate elements can be separately attached to the appartus walls or the plate elements can be compounded in one (or several) plate element packages joined in a frame structure and inserted in the lamella apparatus.

Figure 3:
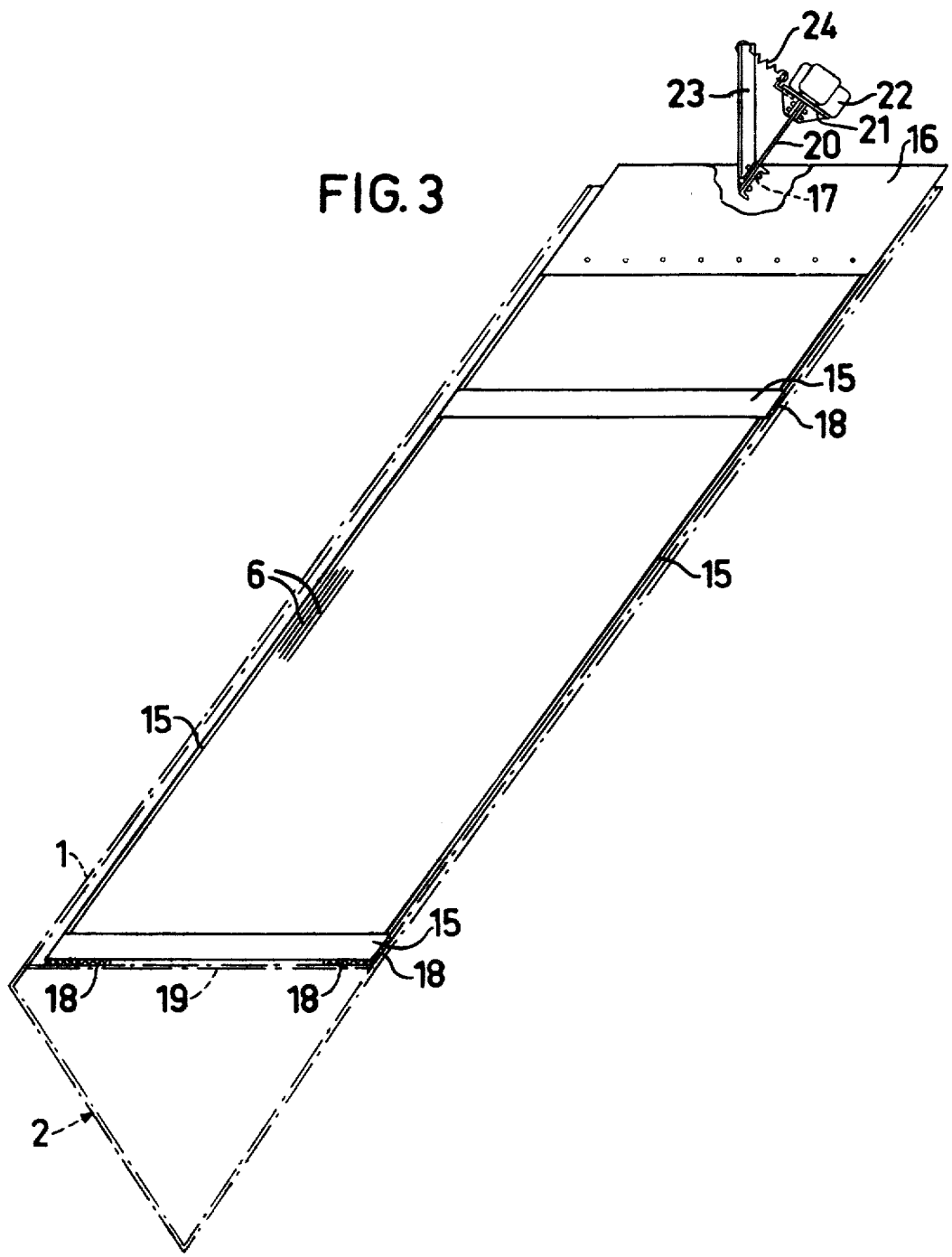
FIGS. 3 and 4 are, respectively, a lateral view and a view seen from the right in FIG. 3 respectively, of an embodiment according to the invention including a plate element package, which schematically is shown arranged in a lamella sedimentation apparatus corresponding to the apparatus of FIG. 1.
Figure 4:
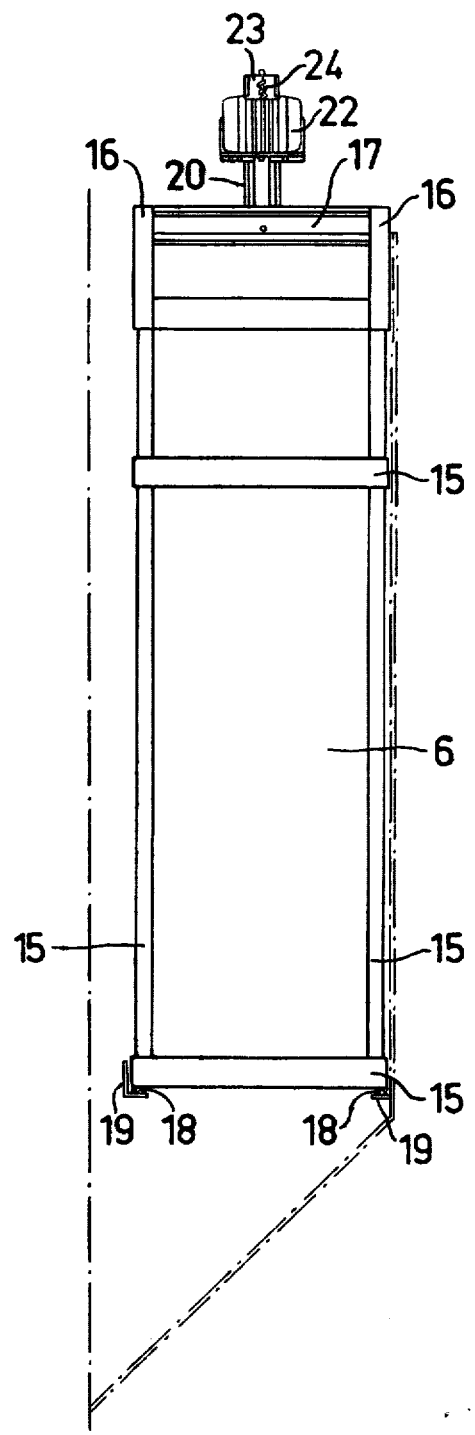

Such a plate element package is schematically illustrated in FIGS. 3 and 4 inserted in a schematically illustrated lamella sedimentation apparatus of the type shown in FIG. 1. Only half the apparatus is shown in FIG. 4 and contains one plate element package. The plate elements 6 are connected by horizontal and inclined frame pieces 15. A stiff yoke consisting of side pieces 16 and an intermediate U-shaped beam 17 is attached (riveted) to the top of the outer plate elements. A lower horizontal frame piece 15 of the plate element package is, with intermediate rubber elements 18, supported on support beams 19 attached to the walls of the apparatus and thus comprises the right edge surface (seen in FIG. 3) of the lower frame piece 15 as well as the right edge surface of the upper horizontal frame piece 15 supported with intermediate rubber elements 18 on the wall surface of the appartus.

An arm 20 is attached to the beam 17 and extends upwardly in the direction of the longitudinal extension of the plate means 6. A support plate 21 is attached to the free end of the arm 20 and has a support surface for a vibrator 22, which surface extends in a plane perpendicular to the extension of the arm 20. Furthermore, a vertical arm 23 is attached to the beam 17 and between the arm 23 and the support plate 21 is a spring means 24 extending perpendicular to the arm 20.

The vibrator 22 generates oscillations in the direction of the arm 20 as well as perpendicular thereto. These latter oscillations, however, are absorbed by the spring means 24 and therefore mainly only oscillations in the extension of the plate elements 6 are transferred to the plate element package. Thus, by the particular arrangement of the vibrator, measures have been taken for transferring only longitudinal oscillations to the plate elements, whereby to the utmost possible extent deposits of sediment on the plate element surfaces are avoided and the transport capacity increased, while at the same time, by absorbing the transverse oscillations from the vibrator, there is no (or inconsiderable) disturbing of the sedimentation process per se.

The oscillations from the vibrator shall perferably have small amplitude, less than 1 mm, and preferably are within the frequency range 25–200 Hz.

Figure 5:
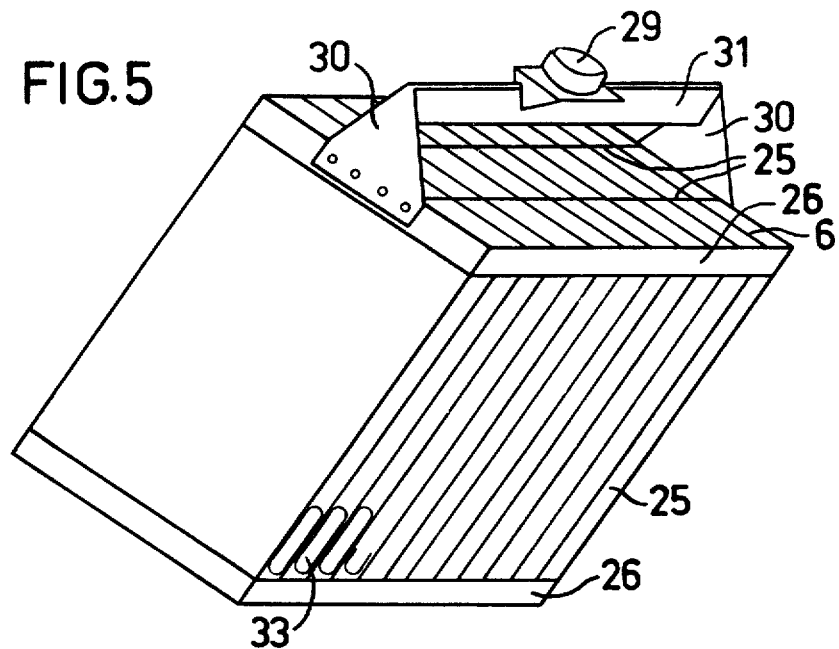
FIGS. 5 and 6 show somewhat schematically further embodiments of plate element packages and a vibrator connected thereto and adapted to be arranged in a lamella sedimentation apparatus for instance of a type shown in FIG. 1.
Figure 6:
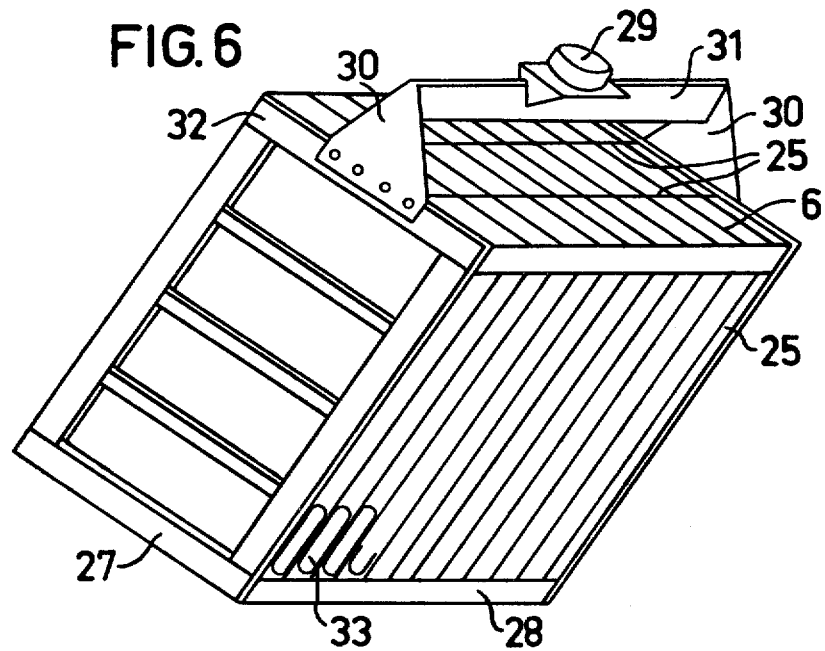

Other embodiments of plate element packages provided with vibrator are schematically illustrated in FIGS. 5 and 6.

The distance between the plate elements 6 may for example be obtained by inserting the plate elements in grooves (not shown) in opposite side walls, or each plate element may be provided with ledges 25 along the longitudinal side edges of the plate element (plate element U-shaped in cross-section). Should the width of the plate elements be large, such ledges 25 could also be arranged between the side edges.

FIG. 5 illustrates stiffening ribs 26 at the top and the bottom around the plate element package. FIG. 6 illustrates side frames 27 and intermediate tension rods 28.

In the embodiment shown in FIG. 5, a vibrator or mechanical hammer 29 is attached on a beam 31 located between side pieces 30 and the side pieces are riveted to the top stiffening rib 26. In the embodiment according to FIG. 6, corresponding side pieces 30 are riveted to the top frame portion 32 of each side frame 27.

In order to guarantee that the vibrations from the vibrator are transferred to each plate element, the plate elements provided with the ledges can be glued (or screwed or riveted) together. In order to be able to take apart and inspect each plate element, it is possible to glue (or screw or rivet) together the ledges on one side of the plate elements. For this latter case, the embodiment according to FIG. 6 having side frames 27 and tension rods 28 is preferably used. If the plate elements, as mentioned above, are inserted in grooves in the side walls, gluing can be avoided by having a snugly fitting between the plate element edges and the grooves. Also for this case, however, it is possible to the snug fit with gluing.

The schematically illustrated vibrator 29 is arranged and formed such that only (or mainly only) oscillations in the extension of the plate elements are transferred to the plate elements via the side pieces 30. The vibrator may have a form and be arranged as shown in FIGS. 3 and 4. In order to obtain an equal distribution of the vibrations and to prevent the transfer of the vibrations to the walls of the lamella apparatus or other details in the apparatus irrelevant to the transport capacity, the plate element package according to FIGS. 5 and 6 can be arranged in the lamella apparatus on a resilient support, such as rubber elements 18 according to FIGS. 3 and 4. Alternatively, the plate element package of FIGS. 5 or 6, as well as the plate element package illustrated in FIGS. 3 and 4, may be suspended in spring means in the lamella apparatus.

The plate element packages according to FIGS. 5 and 6 are particularly formed to be arranged in a lamella sedimentation apparatus according to FIG. 1. The inlets to each sedimentation space for the suspension consist here of openings 33 (only a few shown).

What is claimed is:

1. A sedimentation apparatus for continuously treating a liquid suspension to separate clarified liquid from sediment comprising:
   a housing,
   a plurality of inclined parallel plate means within said housing providing a plurality of parallel inclined passages for the passage of the liquid suspension therebetween,
   inlet means for delivering said liquid suspension to all said passages,
   means for mounting said plate means in yieldable connection relative to said housing,
   at least one vibrator means,
   means for connecting said vibrator means to said plate means for vibrating said plate means with substantially only oscillations in the direction of inclination of said plate means for preventing deposits of sediment on said plate means without disturbing the sedimentation, and
   first and second means for receiving, respectively, clarified liquid and sediment discharged from said passages.

2. An apparatus as claimed in claim 1 wherein said means for mounting said plate means consists of resilient means supporting said plate means.

3. An apparatus as claimed in claim 1 wherein said means for mounting said plate means consists of resilient means suspending said plate means.

4. A sedimentation apparatus for continuously treating a liquid suspension to separate clarified liquid from sediment comprising
   a housing
   a plurality of inclined parallel plate means within said housing providing a plurality of parallel inclined passages for the suspension therebetween, means for interconnecting a plurality of said plate means to form a compound package,
   inlet means for the suspension for delivering said suspension to all said passages,
   means for mounting said said compound package of plate means in yieldable connection relative to said housing,
   at least one vibrator means,
   means for connecting said vibrator means to said plate means package for vibrating said plate means in said plate means package with substantially only oscillations in the direction of inclination of said plate means for preventing deposits of sediment on said plate means without disturbing the sedimentation per se, and separate means for receiving clarified liquid and sediment discharged from said passages.

5. An apparatus as claimed in claim 4 wherein said means for mounting said plate means package consists of resilient means supporting said plate means package.

6. An apparatus as claimed in claim 4 wherein said means for mounting said plate means package consists of resilient means suspending said plate means package.

7. An apparatus as claimed in claim 4 wherein one vibrator means is connected to each plate means package.

* * * * *